(12) United States Patent
Washiro

(10) Patent No.: US 8,391,783 B2

(45) Date of Patent: Mar. 5, 2013

(54) COMMUNICATION APPARATUS

(75) Inventor: Takanori Washiro, Kanagawa (JP)

(73) Assignee: Sony Corporation, Tokyo (JP)

(*) Notice: Subject to any disclaimer, the term of this patent is extended or adjusted under 35 U.S.C. 154(b) by 937 days.

(21) Appl. No.: 12/481,277

(22) Filed: Jun. 9, 2009

(65) Prior Publication Data

US 2010/0019982 A1 Jan. 28, 2010

(30) Foreign Application Priority Data

Jul. 24, 2008 (JP) ................................ 2008-191490

(51) Int. Cl.
*H04B 5/00* (2006.01)

(52) U.S. Cl. ....................... 455/41.1; 455/41.2; 455/130

(58) Field of Classification Search ................. 455/41.1, 455/41.2, 130, 150.1, 193.1
See application file for complete search history.

(56) References Cited

U.S. PATENT DOCUMENTS

| | | | | |
|---|---|---|---|---|
| 7,106,256 | B2 * | 9/2006 | Watanabe et al. | 343/700 MS |
| 7,430,216 | B2 * | 9/2008 | Yoshida et al. | 370/452 |
| 7,587,182 | B2 * | 9/2009 | Kawai | 455/130 |
| 8,180,288 | B2 * | 5/2012 | Hebiguchi et al. | 455/41.1 |

FOREIGN PATENT DOCUMENTS

| | | |
|---|---|---|
| JP | 3-141730 | 6/1991 |
| JP | 2003-8453 | 1/2003 |
| JP | 2003-78315 | 3/2003 |
| JP | 2004-145873 | 5/2004 |
| JP | 2006-173913 | 6/2006 |
| JP | 2006-350993 | 12/2006 |
| JP | 2007-36439 | 2/2007 |
| WO | WO 2006/121241 A1 | 11/2006 |

OTHER PUBLICATIONS

Office Action issued Sep. 7, 2010, in Japan Patent Application No. 2008-191490.

* cited by examiner

*Primary Examiner* — Tuan H Nguyen
(74) *Attorney, Agent, or Firm* — Oblon, Spivak, McClelland, Maier & Neustadt, L.L.P.

(57) ABSTRACT

The communication apparatus includes a capacitive coupling electrode which is capacitively coupled with an adjacent conductor or an adjacent dielectric and which operates the conductor or the dielectric as an antenna element for electromagnetic waves of a predetermined frequency, and a matching circuit which is connected to the capacitive coupling electrode and which matches impedance of the conductor or the dielectric to be operated as the antenna element for the electromagnetic waves of the predetermined frequency when the conductor or the dielectric is adjacent and capacitively coupled therewith.

10 Claims, 13 Drawing Sheets

COMMUNICATION APPARATUS

BACKGROUND OF THE INVENTION

1. Field of the Invention

The present invention relates to a communication apparatus.

2. Description of the Related Art

An antenna which is used for radio communication radiates electromagnetic waves (radio waves) for radio communication after receiving input of a transmission signal (electric voltage or electric current) of a predetermined frequency. Conversely, the antenna also receives electromagnetic waves and converts into a reception signal (electric voltage or electric current). Here, when the antenna has a length corresponding to a wavelength which is used for the radio communication, receiving sensitivity and transmitting efficiency of electromagnetic waves can be improved.

Thus, the length of an antenna element (an antenna line) normally tends to be set at an approximate integral multiple of a quarter wavelength of the electromagnetic waves. In particular, the length of such an antenna element is an important factor for designing an antenna which is used for middle-range communication or long-range communication. It is similar to short-range communication as well. On the other hand, as disclosed in Japanese Patent Application Laid-Open No. 2007-36439, a technology of human body communication which utilizes a human body as a transmission path has been recently developed as for short-range communication. However, since a human body is utilized as the transmission path, the communication distance is limited. Therefore, it is difficult to apply the human body communication technology to middle-range communication or long-range communication.

SUMMARY OF THE INVENTION

By the way, compact electronic devices which can be carried such as a cellular phone, a portable television and a notebook PC (Personal Computer) are widely spread in accordance with recent progress of the electronic technology. These devices are provided with a communication function including a case of merely receiving broadcast waves and seem to be a kind of communication apparatus. Thus, the communication apparatuses have been downsized. Here, the electromagnetic waves for the radio communication use a variety of frequencies. The wavelength is proportional to the reciprocal number of the frequency. Therefore, the wavelength of low frequency electromagnetic waves is to be long, for example. Here, the length of the abovementioned antenna element (hereinafter, also called the element length) is desirably to be set at an integral multiple of a quarter wavelength in most cases. Therefore, the element length is to be long for the low frequency electromagnetic waves of which wavelength is long. In this manner, downsizing of the communication apparatus for the low frequency electromagnetic waves is technically contradictory to producing the antenna element of which characteristic is preferable for the low frequency electromagnetic waves. Therefore, it is difficult to produce an antenna which is compact and highly effective. Consequently, it has been difficult to successfully achieve both downsizing of a communication apparatus and improving of a transmission and reception characteristic of electromagnetic waves.

The present invention has been made in view of the above issue and it is desirable to provide a newly improved compact communication apparatus of which transmission and reception characteristic can be enhanced.

According to an embodiment of the present invention, there is provided a communication apparatus which includes a capacitive coupling electrode which is capacitively coupled with an adjacent conductor or an adjacent dielectric and which operates the conductor or the dielectric as an antenna element for electromagnetic waves of a predetermined frequency, and a matching circuit which is connected to the capacitive coupling electrode and which matches impedance of the conductor or the dielectric to be operated as the antenna element for the electromagnetic waves of the predetermined frequency when the conductor or the dielectric is adjacent and capacitively coupled therewith. Normally, a conductor such as a metallic material of which loss is small is used for the antenna element. However, a dielectric is operable as the antenna element because of capability of transmitting an alternate current signal. In this case, when the conductor or dielectric is not adjacent, the impedance is not matched.

With this configuration, the coupling electrode is capable of being capacitively coupled with an adjacent conductor or dielectric. Then, the coupling electrode and the matching circuit can operate the coupled conductor or dielectric as an antenna element for electromagnetic waves of a predetermined frequency. Therefore, it may be unnecessary to keep space for accommodating an antenna element in the communication apparatus. In addition, the transmission and reception characteristic of the electromagnetic waves of the predetermined frequency may be improved.

The matching circuit may be configured so that voltage standing wave ratio becomes nearer to 1 when the conductor or the dielectric is capacitively coupled with the capacitive coupling electrode than that when the conductor or the dielectric is not capacitively coupled with the capacitive coupling electrode.

The communication apparatus may include an insulating member which performs insulation between the capacitive coupling electrode and the conductor or the dielectric which is adjacent to the capacitive coupling electrode.

The conductor or the dielectric may be a human body.

The capacitive coupling electrode may be formed to a plate-shape which is larger than a shape of the adjacent human body projected to the capacitive coupling electrode.

The capacitive coupling electrode may operate the conductor or the dielectric as the antenna element for the electromagnetic waves having a wavelength of the same level as the length of the conductor or the dielectric.

The communication apparatus may include a processing unit which performs a predetermined process in accordance with presence or absence of a reception signal received by the conductor or the dielectric operating as the antenna element for the electromagnetic waves of the predetermined frequency.

The communication apparatus may include a plurality of the capacitive coupling electrodes, wherein the processing unit may determine which process is to be performed among predetermined processes in accordance with that which electrode among the plurality of capacitive coupling electrodes has received the reception signal.

The processing unit may determine to provide a predetermined service or not in accordance with presence or absence of the reception signal.

The processing unit may make an external processing apparatus operate the predetermined process when the reception signal is received.

The capacitive coupling electrode may operate the conductor or the dielectric as the antenna element which receives broadcast waves.

According to the embodiments of the present invention described above, both downsizing and improving of the transmission and reception characteristic can be achieved.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In the communication apparatus according to each of the embodiments of the present invention, an arbitrary conductor or dielectric such as a human body, for example, is operated as the antenna element of which element length is to be an approximate integral multiple of a quarter wavelength of the operating frequency. Accordingly, the communication apparatus may be downsized. In addition, reception sensitivity and transmission efficiency of radio communication with the communication apparatus can be improved. In the following, first, the configuration and the operation etc. of the communication apparatus are described as the first embodiment for easy understanding. Subsequently, example applications of the communication apparatus are described as the embodiments of the second and later. That is, the description is performed in the following order.

1. First embodiment 1.1 Configuration of the communication apparatus: FIG. 1

1.2 Operation of the communication apparatus: FIG. 2A and FIG. 2B 1.2.1 First example of the capacitive coupling: FIG. 2C 1.2.2 Second example of the capacitive coupling: FIG. 2D 1.2.3 Third example of the capacitive coupling: FIG. 2E 1.3 Examples of the effect 2. Second embodiment: FIG. 3 (An application to a broadcast wave reception apparatus)

3. Third embodiment: FIG. 4A and FIG. 4B (An application to a vending machine)

4. Fourth embodiment: FIG. 5A and FIG. 5B (An application to an external processing apparatus)

5. Fifth embodiment: FIG. 6A and FIG. 6B (An application to an automatic door)

6. Sixth embodiment: FIG. 7 (An application to human body communication)

7. Seventh embodiment: FIG. 8 (An application to a system of a plurality of the communication apparatuses)

In the following, the communication apparatus of the present invention is denoted by the "communication apparatus 100" as illustrated in FIG. 1. In a case that a plurality of communication apparatuses 100 are used, the communication apparatuses are denoted by the "communication apparatuses 101 through 104" as illustrated in FIG. 8. Basically, the communication apparatuses 101 through 104 are configured similarly to the communication apparatus 100 and differences are appropriately described. In addition, various apparatuses which can perform radio communication using electromagnetic waves of a predetermined frequency are included in the "communication apparatus". For example, the communication apparatus includes reception apparatuses such as general radios and general televisions and transmission apparatuses such as base stations thereof as well as communication apparatuses which perform bidirectional communication such as cellular phones, radios, recent digital televisions. Further, the communication apparatus can be handled as an antenna in a case that a transmission circuit and a reception circuit (i.e., a processing unit 130) are not included. The communication apparatus can also configure one system with another device as described in the embodiments of the third through the fifth, for example.

1. First Embodiment

As described above, the communication apparatus according to the first embodiment of the present invention is described as a representative example of the communication apparatuses of the respective embodiments of the present invention with reference to FIGS. 1 through 2E.

(1.1 The Configuration of the Communication Apparatus): FIG. 1

FIG. 1 is an explanatory view which illustrates the configuration of the communication apparatus according to the first embodiment of the present invention.

As illustrated in FIG. 1, the communication apparatus 100 according to the present embodiment includes a coupling unit 110, a matching circuit 120 and the processing unit 130.

The coupling unit 110 is configured to be capacitively coupled with a predetermined conductor or dielectric when the conductor or dielectric is arranged adjacently. Therefore, the coupling unit 110 includes a coupling electrode 111 and insulating unit 112.

The coupling electrode 111 is an example of a capacitive coupling electrode which performs the capacitive coupling. The coupling electrode is formed of a conductor such as a metallic material, for example.

For example, the coupling electrode 111 is formed to be a plate-shape as illustrated in FIG. 1 so as to be capacitively coupled easily with the predetermined conductor or dielectric which approaches from the plus value side in X-axis direction. However, the shape of the coupling electrode 111 is not limited to a plate-shape. In a case of not being plate-shaped, the coupling electrode 111 is desirably formed to a shape similar to a surface of the opposite conductor or dielectric to be capacitively coupled as being opposed to the coupling electrode 111. In a case that the shape of the opposite conductor or dielectric is not defined, the shape of the coupling electrode 111 is desirably a plate-shape as illustrated in FIG. 1. It becomes possible to strengthen the coupling with the opposite conductor by forming the coupling electrode 111 as the shapes described above.

In the case that the coupling electrode 111 is formed as a plate-shape, the coupling electrode 111 is desirably formed to be larger than a shape of the opposite conductor or dielectric projected to the coupling electrode 111. Thus, the capacitive coupling can be further strengthened by enlarging the area of the plate-shaped coupling electrode 111. As described later, when assuming a case that a body of a person (i.e., a human body) is used as the conductor or dielectric of the coupling opposite and the human body gets on the coupling electrode 111, for example, there may be shoes or clothes between the coupling electrode 111 and the human body which is dielectric. However, by enlarging the area of the coupling electrode 111, the coupling electrode 111 is capable of performing the capacitive coupling sufficiently even when such an insertion material exists. The reason why the capacitive coupling can be strengthened by the shape or the area of the coupling electrode 111 is qualitatively described by artificially replacing the capacitive coupling with a capacitor. Comparing the coupling electrode 111 and the opposing surface of the opposite conductor or dielectric with a capacitor which is configured by two electrodes, the capacitance C of this capacitor is inversely proportional to the distance and is proportional to the area. Therefore, the capacitive coupling can be strengthened by forming the shape of the coupling electrode 111 so that the distance is uniformly small and the area is large. In the following, the case forming the coupling electrode 111 as a plate-shape is described as an example.

Due to the capacitive coupling of the coupling electrode 111 with the abovementioned predetermined conductor or dielectric, the conductor or dielectric is further operated as the antenna element for the electromagnetic waves of the predetermined frequency (hereinafter, also called operating electromagnetic waves). At that time, the frequency of the operating electromagnetic waves is desirably set so that the wavelength thereof is to be the same level as the length of the conductor or dielectric. Further, in a case that the matching circuit 120 which is described later is provided, the frequency of the operating electromagnetic waves is desirably set so that the wavelength thereof is to be the same level as the element length of the antenna which is configured with the matching circuit 120 and the conductor or dielectric. Incidentally, the predetermined conductor or dielectric of the coupling opposite and the operation thereof as the antenna element are described later in details.

The insulating unit 112 performs insulation between the coupling electrode 111 and the conductor of the coupling opposite which is arranged adjacent to the coupling electrode 111. For example, the insulating unit 112 is made of an insulating material and arranged so as to cover the coupling electrode 111 at the part opposite to the conductor. FIG. 1 illustrate the case that the insulating unit 112 covers a surface of the plus value side in X-axis direction to which the conductor is adjacent in a layered manner since the coupling electrode 111 is formed as a plate-shape. However, it is also possible to form the insulating unit 112 so as to cover only a part opposed to the conductor or so as to cover the whole coupling electrode 111 in a case that the coupling electrode 111 is formed as another shape.

By providing the insulating unit 112, the coupling unit 110 can perform strong capacitive coupling stably with the conductor of the coupling opposite. In a state that the insulating unit 112 is not provided, for example, there is an extremely large difference in the current amount flowing between the antenna element and the coupling electrode 111 when comparing the case that the conductor is directly contacted to the coupling electrode 111 (i.e., direct connection) with the case that the conductor is adjacent thereto with a clearance (i.e., capacitive coupling). Such a large variation of the current may cause a large deviation in the amplitude value of the electromagnetic waves radiated from the conductor when the conductor is operated as the antenna element. Similarly, large deviation in the amplitude value of the reception signal may be caused in a case that the electromagnetic waves are received by the antenna element. Here, by previously covering the coupling electrode 111 with the insulating unit 112, the conductor is contacted to the insulating unit 112. Thus, the distance between the conductor and the coupling electrode 111 can be maintained at constant and the strength of the capacitive coupling can be stabilized. In other words, the insulating unit 112 can stabilize the communication state of the communication apparatus 100. In a case that a human body is used as the dielectric of the coupling opposite and the coupling electrode 111 is made of a metallic material, there may be a possibility that metal allergy occurs depending on a person. The insulating unit 112 enables the coupling electrode 111 to be capacitively coupled safely with a person having such an allergy.

The matching circuit 120 is connected to the coupling electrode 111 and matches the impedance of the opposite conductor or dielectric so that the conductor or dielectric with which the coupling electrode 111 is coupled is operable as the antenna element for the operating electromagnetic waves. FIG. 1 illustrates an example of the matching circuit of a lumped constant type including an inductance 121 which is serially connected to a transmission path and a capacitance 122 of which one end is connected between the inductance 121 and the coupling electrode 111 and the other end is grounded. Here, the configuration of the matching circuit 120 is not limited to the lumped constant type as illustrated in FIG. 1. In addition to other lumped constant types, a matching circuit of a distributed constant type or a matching circuit which combines a lumped constant type and a distributed constant type can certainly be adopted.

The matching circuit 120 is configured so that the VSWR (Voltage Standing Wave Ratio) generated by the frequency of the operating electromagnetic waves at the conductor or dielectric which is capacitively coupled to the coupling electrode 111 and the matching circuit 120 itself nears 1. In other words, the matching circuit 120 is configured so that the capacity of each portion (for example, the inductance 121 and the capacitance 122) is set as follows against the predetermined conductor or dielectric at the frequency of the operating electromagnetic waves. For example, first, the frequency of the operating electromagnetic waves and the conductor or dielectric to be used for the antenna element are determined. Then, the coupling unit 110 having the coupling electrode 111 is formed. The determined conductor or dielectric is approached to the coupling electrode 111 so as to be capacitively coupled. Then, the matching circuit 120 between a power-supplying line and the coupling electrode 111 is configured so that the VSWR nears 1 by utilizing a network analyzer etc. As a result, the matching circuit 120 which can operate the determined conductor or dielectric as the antenna element with a preferred characteristic at the determined frequency can be configured. With the matching circuit 120 which is configured as mentioned above, the communication apparatus 100 can artificially prolong or shorten the length of the conductor or dielectric to the length effectively operable as the antenna element even when the conductor or dielectric is shorter or longer than the integral multiple of a quarter wavelength of the operating electromagnetic waves, for example. Accordingly, the communication apparatus 100 can set the total length of the matching circuit 120 and the conductor or dielectric at an approximate integral multiple of a quarter wavelength of the operating electromagnetic waves and the communication characteristic can be improved. Here, in this case, when the conductor or dielectric of a certain length is not capacitively coupled, the matching is not performed and the VSWR becomes large.

However, in a case that the preferable communication characteristic can be secured only by the conductor or dielectric, such as a case that the length of the conductor or dielectric is approximately equal to an integral multiple of a quarter wavelength of the operating electromagnetic waves, the matching circuit 120 is not necessarily provided. In the communication apparatus 100 according to the present embodiment, it is desirable to previously determine the conductor or dielectric which is to be operable for the antennal element. However, the length of the conductor is not uniform all the time. Since such deviation in length of the conductor or dielectric is to be deviation from the integral multiple of a quarter wavelength of the operating electromagnetic waves, the communication characteristic (for example, reception sensitivity and transmission efficiency etc.) is affected. Then, by arranging the matching circuit 120 as in the present embodiment, the ratio of the length deviation of the conductor or dielectric against the element length of the antenna which is artificially formed by the matching circuit 120 and the conductor or dielectric can be suppressed. Thus, the matching circuit 120 can stabilize the communication characteristic while suppressing the length deviation of the conductor or dielectric.

In the following, the conductor or dielectric and the length thereof are described before describing the processing unit 130 which is the remaining configuration.

In the present embodiment, the conductor or dielectric which is capacitively coupled with the coupling electrode 111 and performs a function as the antenna element through which an alternate current signal flows is previously determined as described above. As the conductor or dielectric, various materials can be adopted as long as an alternate current signal can flow through the conductor or dielectric, such as creatures of a body of a person (hereinafter, also merely called a human body), a body of an animal, and a plant etc., vehicles of an automobile, a rolling stock, a bicycle, a boat etc., structures of a bridge, a building, a house etc., members of a window sash, a door, a knob etc., and other electronic devices etc. Here, the length of the conductor or dielectric denotes length of various parts not limited to a specific length. For example, in a case that the dielectric is a human, the length denotes height, width of a body, size of a hand, width of a foot and the like. In other words, the length of the conductor or dielectric is not limited to the longest length like a resonant wavelength of a violin is not limited to the length in the longitudinal direction of the violin body. In the following, in convenience of description, a human body is used for the dielectric and the height is used for the length of the dielectric. Although the loss is larger than that of a metallic material, a human body is a dielectric which can transmit a high frequency signal to some extent. Therefore, the communication apparatus 100 according to the present embodiment can operate the human body as a part of radiation element of the antenna instead of the metallic material.

The processing unit 130 inputs a transmission signal (for example, a high frequency signal) of the frequency of the operating electromagnetic waves to the human body serving as the antenna element sequentially via the matching circuit 120 and the coupling electrode 110. Further, the processing unit 130 acquires a reception signal received by the human body which serves as the antenna element. Thus, it is preferable that the processing unit 130 has at least either of the transmission function and the reception function, for example. In a case that the communication apparatus 100 is used as a transmission apparatus, the processing unit 130 includes a power source, an oscillation circuit and a modulation circuit and outputs the high frequency signal generated thereby to the matching circuit 120. As a result, the communication apparatus 100 can radiate the operating electromagnetic waves for the communication to the outside from the antenna element of which part is configured by the human body. On the other hand, in a case that the communication apparatus 100 is used as a reception apparatus, the operating electromagnetic waves can be received by the antenna element of which part is configured by the human body by arranging a reception circuit which receives the reception signal of the frequency of the operating electromagnetic waves.

Here, the processing unit 130 may have functions to perform other processes. Such other functions are described in the embodiments of the second through the seventh.

Up to this point, the configuration of the communication apparatus 100 according to the present embodiment is described.

Next, the operation of the communication apparatus 100 according to the present embodiment is described. In the following description of the operation of the communication apparatus 100, the operating electromagnetic waves are transmitted. Since receiving the operating electromagnetic waves is almost the same except for the reversed flow of the signal, the redundant description is omitted.

(1.2 Operation of the Communication Apparatus)

FIG. 2A and FIG. 2B are explanatory views which describe the operation of the communication apparatus according to the present embodiment.

FIG. 2A illustrates a state that the human body serving as an example of the dielectric is capacitively coupled with the coupling electrode 111. On the other hand, FIG. 2B illustrates a state that the human body is not capacitively coupled with the coupling electrode 111.

As illustrated in FIG. 2A, in the case that the human body 200 is capacitively coupled with the coupling electrode 111, the human body 200 is operated as the antenna element when a signal is received from the processing unit 130. Accordingly, the electromagnetic waves of the desired frequency can be radiated at high radiation efficiency as the antenna element.

On the other hand, as shown in FIG. 2B, a signal is assumed to be input from the processing unit 130 in the case that the human body 200 is not capacitively coupled with the coupling electrode 111. In this case, since the matching circuit 120 is configured so that the impedance is matched when the human body 200 is capacitively coupled with the coupling electrode 111, return loss of the signal becomes large without the capacitive coupling. Accordingly, the communication apparatus 100 hardly radiates the electromagnetic waves to the outside.

The abovementioned is the same in the case that the communication apparatus 100 receives the electromagnetic waves. The electromagnetic waves are received from the outside when the human body 200 is coupled with the coupling electrode 111. However, the reception signal becomes extremely weak without the coupling.

(1.2.1 First Example of the Capacitive Coupling)

Various configurations can be considered as the capacitive coupling by the coupling electrode 111 with the human body 200, namely, as the capacitive coupling with the dielectric. Here, an example of the configuration of the capacitive coupling is described.

FIG. 2C is an explanatory view which illustrates the first example of the capacitive coupling of the communication apparatus according to the present embodiment.

As illustrated in FIG. 2C, the communication apparatus 100 can be coupled by the coupling electrode 111 with the human body 200 of the user simply by being carried by the user, for example. The communication apparatus 100 can be coupled with the human body 200 even in the cases of being contacted to the user's cloth, being carried in a cloth or a bag, and being dangled with a strap, for example. In these cases, it is desired that the coupling electrode 111 is arranged to face the human body 200.

(1.2.2 Second Example of the Capacitive Coupling)

FIG. 2D is an explanatory view which illustrates the second example of the capacitive coupling of the communication apparatus according to the present embodiment.

As illustrated in FIG. 2D, the communication apparatus 100 is previously arranged at a predetermined position. The communication apparatus 100 can be coupled with the human body 200 when the user holds a part of the human body 200 over the position of the coupling electrode 111 or touches the coupling electrode 111 through the insulating unit 112.

As the second example, FIG. 2D illustrates a case that the communication apparatus 100 is touched by a user's finger. However, not limited to a finger, the position of the user to touch the communication apparatus 100 may be selected from various parts such as the head, a body part, an arm part and a leg part. As an application example of the abovementioned, the following third example may be considered as well.

(1.2.3 Third Example of the Capacitive Coupling)

FIG. 2E is an explanatory view which illustrates the third example of the capacitive coupling of the communication apparatus according to the present embodiment.

As illustrated in FIG. 2E, the communication apparatus 100 is arranged at the position such as a floor, stairs and a chair where the user may get on. The communication apparatus 100 can be coupled with the human body 200 when the user gets on the coupling electrode 111. In this case, the user will not recognize that his/her own human body 200 is working as the antenna element and neither will he/she recognize the existence of the communication apparatus 100. Here, since there is a possibility that the user wears shoes, the coupling electrode 111 is configured to have area larger than the projected area of the user. With this configuration, the capacitive coupling between the human body 200 of the user and the coupling electrode 111 can be strengthened.

Here, the examples of the capacitive coupling are simply examples. It is needless to say that various application examples may be possible in accordance with the type of the conductors.

(1.3 Examples of the Effects)

Up to this point, the communication apparatus 100 according to the first embodiment of the present invention is described.

Since the communication apparatus 100 has the coupling electrode 111, an external conductor or dielectric such as the human body 200 can be used for the antenna element. Therefore, it may be unnecessary to keep space for accommodating the antenna element in the communication apparatus 100 itself. Accordingly, the communication apparatus 100 can be downsized.

For example, from a viewpoint of keeping space for the antenna in a case that the communication apparatus 100 is used for a portable device, the portable device may have been upsized or electromagnetic waves of a short wavelength corresponding to the length of the antenna element which can be arranged in an acceptable space have been used. Further, in this case, a small antenna against the wavelength has been used at the expense of a communication characteristic to some extent. However, with the communication apparatus 100 according to the present embodiment, the transmission and reception characteristic can be improved while downsizing the portable device since the external conductor or dielectric such as the human body can be used as the antenna element. By the way, the arrangement position and the size of the antenna add constraints to design of portable devices. However, with the communication apparatus 100 according to the present embodiment, such constraints for design can be greatly reduced and design performance can be easily improved. Further, as described above, in the case that the human body 200 is used for the conductor or dielectric, the communication apparatus 100 can be used while being accommodated in a cloth or a bag. Accordingly, the communication apparatus 100 can be handled by the user without his/her hand.

Next, application examples using the communication apparatus 100 according to the first embodiment are described in the embodiments of the second through the seventh. Here, it is needless to say that other applications can be variously formed in addition to the following embodiments which are simply described as application examples.

2. Second Embodiment

FIG. 3 is an explanatory view which illustrates the communication apparatus according to the second embodiment of the present invention.

FIG. 3 illustrates a case that the communication apparatus 100 operates the human body 200 as the antenna element which receives broadcast waves transmitted from a base station 300 or a satellite.

In general, the length of an antenna element is determined by the wavelength of the operating broadcast waves. It is difficult to obtain an effective gain with an antenna of which element length is extremely short compared with the wavelength. For example, the one-segment (1 seg) broadcast which began recently uses broadcast waves of a frequency band of the ultra high frequency (UHF) which is approximately 470 to 770 MHz. Depending on a case, the wavelength may be extended to several tens of cm. Due to the wavelength, the portable device for the one-seg broadcast which is started for enjoying simple programs is difficult to be downsized with accommodating the antenna. Therefore, the antenna is arranged outside in many cases. However, with the communication apparatus 100 according to the present embodiment, the coupling electrode 111 can be capacitively coupled with the human body 200 when the communication apparatus 100 is held by the user, for example. As a result, the communication apparatus 100 can operate the human body 200 and possibly with the matching circuit 120 as the antenna element. Therefore, by adopting the communication apparatus 100 to a small-sized device such as a portable device, the device can be further downsized with an antenna of a high gain. In the case that a human body is used for a part of an antenna for transmission, there may be a concern of influence to one's health when the transmission voltage is large. However, in the case that the human body is used for a part of an antenna for reception, there may be no influence to one's health due to the usage of the human body as a part of an antenna because the human body is not to be bathed in signals more than the radio waves which originally exist in the air.

In the description of the present embodiment, the communication apparatus 100 receives the broadcast waves. As another application example, it is also possible that the processing unit 130 performs a predetermined process which is previously established in accordance with presence or absence of the reception signal received by the human body 200 serving as the antenna element. With a general communication apparatus, switching of executing a process of transmission, reception etc. is performed by the user or by a separate controller. However, with the processing unit 130, the switching can be performed by whether or not the human body 200 is touched to the coupling electrode 111. In other words, the processing unit 130 may function as the switch. Application examples in which the processing unit 130 performs a predetermined process are described in the embodiments of the third through the fifth.

3. Third Embodiment

FIG. 4A and FIG. 4B are explanatory views which illustrate the communication apparatus according to the third embodiment of the present invention.

In the application example of the present embodiment, the communication apparatus 100 has a plurality of coupling electrodes 111. In other words, the communication apparatus 100 has a plurality of sets of the coupling electrode 111 and the matching circuit 120. Then, the processing unit 130 can determine which process among previously established predetermined processes is to be performed in accordance with that which one among the plurality of coupling electrodes 111A through 111C receives the reception signal. In FIG. 4A, a vending machine 400 is illustrated as an example having the plurality of coupling electrodes 111A through 111C.

In the present embodiment, the plurality of coupling electrodes 111A through 111C are provided to the vending machine 400 as selection buttons to select an article which is sold by the vending machine 400. Then, the user carries another user communication apparatus 410.

First, the user selects any one of the coupling electrodes 111A through 111C with the human body 200. In other words, the user touches one of the coupling electrodes 111A through 111C, for example, the coupling electrode 111B. Then, the coupling electrode 111B which operates the human body 200 of the user as the antenna element receives the electromagnetic waves radiated from the user communication apparatus 410 and transmits the reception signal to the processing unit 130. The processing unit 130 which obtains the reception signal specifies the coupling electrode 111B of the reception. Then, the processing unit 130 determines that the process which is assigned to the coupling electrode 111B is to be performed and performs the process. For example, the processing unit 130 discharges an article 430 which corresponds to the coupling electrode 111B to an article receiving port 420, as illustrated in FIG. 4B. Further, it is also possible that the processing unit 130 charges to the electronic money function contained in the user communication apparatus 410 by communicating with the user communication apparatus 410 via the coupling electrode 111B, the human body 200, the electromagnetic waves and the like.

In this manner, as in the present embodiment, by applying the communication apparatus 100 to the vending machine 400 etc., the switching to execute the communication or not can be performed in accordance with that the user touches the coupling electrode 111 or not. Thus, the user can switch ON/OFF of the predetermined process including the communication process with the processing unit 130 without recognizing the communication apparatus 100. Here, when a plurality of general antennas are arranged being adjacent one another, there may be a concern of interference with the coupling among the antennas. However, with the communication apparatus 100 according to the present embodiment, there is no antenna element at the coupling electrodes 111A, 111C which are not touched by the user. Thus, the coupling electrodes 111A, 111C hardly radiate the electromagnetic waves to the outside and hardly receive the radiated electromagnetic waves. Accordingly, even when the plurality of coupling electrodes 111 are adjacently arranged as illustrated in FIG. 4A and FIG. 4B, there is no interference between the coupling electrodes 111. The communication can be performed only via the coupling electrode 111 which becomes effective by being coupled with the human body 200. Here, it is needless to say that the similar effect can be obtained when only one coupling electrode 111 is provided.

4. Fourth Embodiment

FIG. 5A and FIG. 5B are explanatory views which describe the communication apparatus according to the fourth embodiment of the present invention.

The communication apparatus 100 according to the present embodiment can determine whether or not a predetermined service is provided in accordance with occurrence of receiving the reception signal. At that time, the communication apparatus 100 can make an external communication apparatus 500 (an example of the external processing apparatus) supply the service.

As an example of the communication apparatus 100, the communication apparatus 100 according to the present embodiment is embedded at a floor, as illustrated in FIG. 5A and FIG. 5B. Then, the external communication apparatus 500 is arranged at the outside. In this case, the human body 200 does not operate as the antenna element and the communication apparatus 100 does not communicate with the external communication apparatus 500 unless the human body 200 gets on the communication apparatus 100, as illustrated in FIG. 5A. On the other hand, when the human body 200 gets on the communication apparatus 100, the human body 200 operates as the antenna element and the communication apparatus 100 becomes capable of communicating with the external communication apparatus 500. When the communication apparatus 100 as mentioned above is applied to voice guidance in an art gallery or a museum, for example, the external communication apparatus 500 can switch whether or not the voice guidance is to be provided.

Further, as another example of the communication apparatus 100 which make an external communication apparatus perform a predetermined process in accordance with occurrence of receiving the reception signal, the fifth embodiment which is illustrated in FIG. 6A and FIG. 6B can be actualized.

5. Fifth Embodiment

FIG. 6A and FIG. 6B are explanatory views which illustrate the communication apparatus according to the fifth embodiment of the present invention.

The communication apparatus 100 according to the present embodiment makes an automatic door 600 serving as the external processing apparatus perform a predetermined process.

For example, as illustrated in FIG. 6A, the communication apparatus 100 is embedded at the floor in front of the automatic door 600. It is possible that the communication apparatus 100 makes the automatic door 600 be closed when there is no reception signal as illustrated in FIG. 6A and be opened when there is the reception signal as illustrated in FIG. 6B. In this case, it is also possible that identification information of the user is stored at a memory of the user communication apparatus 610 and the user communication apparatus 610 transmits the identification information along with the signal to be transmitted to the communication apparatus 100. Accordingly, it is also possible that the communication apparatus 100 can recognize the identification information contained in the reception signal so as to open the door only for the authorized user or so as to charge to the user. Further, it is also possible to manage the entry-exit information by recording who has passed through the door.

Up to this point, the application examples of the communication apparatus 100 according to the first embodiment of the present invention are described. However, these application examples are simply some part of the application examples which become possible with the communication apparatus 100 and other applications can be actualized. Thus, a great many application examples can be actualized with the communication apparatus 100 according to the first embodiment of the present invention. By operating the conductor or dielectric such as the human body 200 as the antenna element, the communication apparatus 100 can be used for a variety of applications.

In the embodiments of the second through the fifth, the conductor or dielectric serving as the antenna element is capacitively coupled with one communication apparatus 100. However, it is also possible to provide a plurality of communication apparatuses 100 according to the first embodiment and single conductor is coupled to the communication apparatuses. Next, an example of the abovementioned is described in the sixth embodiment.

6. Sixth Embodiment

FIG. 7 is an explanatory view which illustrates the communication apparatus according to the sixth embodiment of the present invention.

FIG. 7 illustrates a case that one of the communication apparatuses 101, 102 according to the present embodiment is arranged at a floor and the other is carried by the user. In this case, the communication apparatus 101 which is carried by the user is capacitively coupled with the human body 200 of the user. In addition, the communication apparatus 102 is capacitively coupled with the human body 200 of the same user when the user gets on the communication apparatus 102. In other words, the human body 200 of the user operates as the antenna element for the communication apparatus 101 as well as the antenna element for the communication apparatus 102. In this case, the communication between the communication apparatuses 101, 102 can be performed by directly using the human body 200 of the user as a communication medium without using electromagnetic waves in the air. In this case, the transmission and reception of the communication signal can be performed with extremely small transmitting loss compared with the embodiments of the second through the fifth because electromagnetic waves are not used. For example, in a case that the communication apparatus 101 is used for a non-contact IC card and the communication apparatus 102 is used for a reader/writer thereof, the communication therebetween can be performed freely without holding the non-contact IC card over the reader/writer by the user. As an application example thereof, the communication apparatuses 101, 102 can perform similar functions as the automatic ticket gate at a station and a key of a door. Further, it is also possible for the communication apparatus 101 to simultaneously have a function of identifying and charging for passing through the automatic ticket gate, a function of a door key, and functions which are described in the embodiments of the second through the fifth, for example. In that case, the communication apparatus 101 can use the human body 200 of the user as the communication medium as in the present embodiment and as the antenna element for the electromagnetic waves as in the above-mentioned embodiments. Accordingly, with these communication apparatuses 100, 101, 102, it is possible to integrate a plurality of communication apparatuses and to collectively provide the services which have been provided by each of the communication apparatuses.

Further, as the case that the plurality of communication apparatuses 100 share the single human body 200, it is also possible to provide a new service by complexly combining the use for the antenna element against the electromagnetic waves and the use for the communication medium. The seventh embodiment is described as such an example.

7. Seventh Embodiment

FIG. 8 is an explanatory view which illustrates the communication apparatus according to the seventh embodiment of the present invention.

In FIG. 8, the communication apparatuses 101, 103 are respectively carried by two users and the communication apparatuses 102, 104 are arranged at a floor. Then, in FIG. 8, the human body 201 of one user is on the communication apparatus 102 and the human body 202 of the other user is on the communication apparatus 104. In this case, the communication apparatus 101 and the communication apparatus 102 perform the communication by using the human body 201 of the one user as the communication medium. Then, the communication apparatus 103 and the communication apparatus 104 perform the communication by using the human body 202 of the other user as the communication medium. Here, this communication is referred to as “human body wired communication”. On the contrary, since the human bodies 201, 202 of the users also operate as the antenna elements for each of the communication apparatuses 101, 102, 103, 104, the electromagnetic waves are transmitted from the human bodies 201, 202. Here, the communication with the electromagnetic waves is referred to as “human body wireless communication”.

As described in the sixth embodiment, since the human body wired communication has extremely small transmitting loss compared with the human body wireless communication, the gain thereof becomes large. Therefore, in the case illustrated in FIG. 8, although the electromagnetic waves for the human body wireless communication interferes to the human body wired communication, the influence can be suppressed since the gains are significantly different from each other. Therefore, in the case illustrated in FIG. 8, the users can independently perform the human body wired communication respectively without influencing each other.

On the other hand, when one user (for example, the user of the human body 201) leaves from the communication apparatus 102, the communication apparatus 101 becomes possible to receive the electromagnetic waves transmitted from the human body 202, for example. Accordingly, the communication apparatus 101 can perform the human body wireless communication with at least either of the communication apparatuses 103, 104. Further, when the other user (for example, the user of the human body 202) leaves from the communication apparatus 104 as well, the communication apparatus 103 becomes possible to receive the electromagnetic waves transmitted from the human body 201, for example. In this manner, the communication between the communication apparatus 103 and the communication apparatus 101 becomes operable.

In the present embodiment, the communication apparatuses 101, 103 are assumed to be communication apparatuses which have a call function and a voice replay function and the communication apparatuses 102, 104 are assumed to be voice guidance systems in a museum or an art gallery, for example. In this case, when the user arrives at the predetermined position, voice guidance is transmitted from the communication apparatus 102, 104 to the communication apparatus 101, 103. Then, the communication apparatus 101, 103 can provide the voice to the user. When the voice guidance is not provided, conversation between the users can be performed by performing the communication between the communication apparatuses 101, 103. Accordingly, a way to provide new services can be paved. Service examples by such a complex communication system can be applied variously. Here, additional remark is given to note that the service is not limited to the abovementioned example.

The present application contains subject matter related to that disclosed in Japanese Priority Patent Application JP 2008-191490 filed in the Japan Patent Office on Jul. 24, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

For example, although the matching circuit 120 is configured to be operable to match the impedance to the predetermined conductor or dielectric in the abovementioned embodiments, it is also possible to change each structural element in accordance with the capacitively coupled conductor or dielectric, for example. In this case, it is also possible that the matching circuit 120 includes a plurality of sets of the inductance 121 and the capacitance 122 of which capacities are different one another and a switch to select a set which is actually to be used in accordance with the type of the coupled conductor, for example. Further, it is also possible that the matching circuit 120 includes the inductance 121 of a variable-capacity type, the capacitance 122 of a variable-capacity type, and a control unit to variably change the capacity in accordance with the type of the coupled conductor, for example. In this case, the matching circuit 120 may be configured to include a detector to monitor the VSWR or the supplying power in order to determine the type of the coupled conductor and to be operable to perform matching in accordance with the type.

Figure 1:
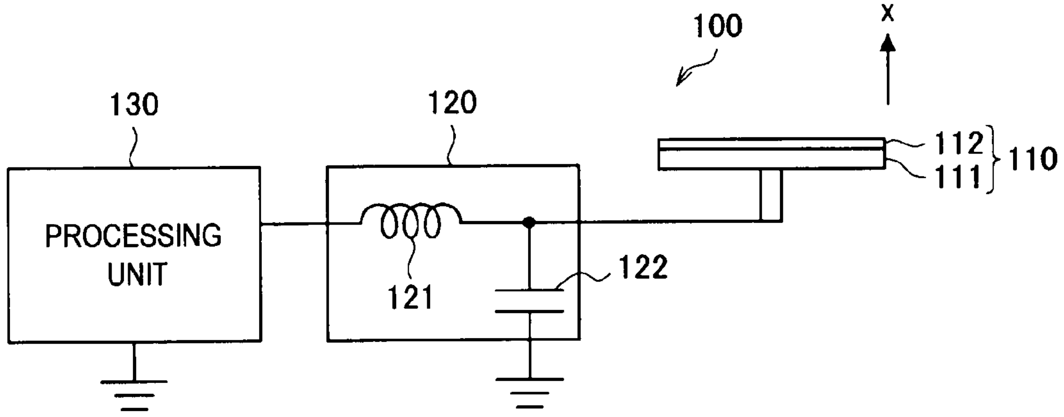
FIG. 1 is an explanatory view which illustrates the configuration of a communication apparatus according to a first embodiment of the present invention.
Figure 2A:
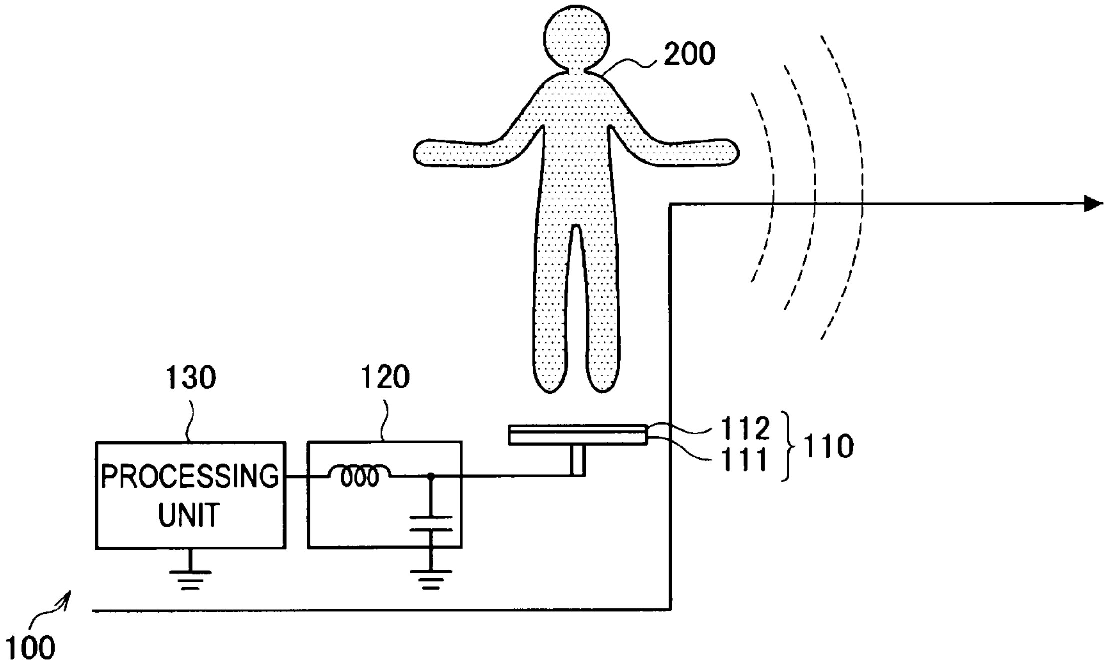
FIG. 2A is an explanatory view which illustrates the operation of the communication apparatus according to the present embodiment.
Figure 2B:
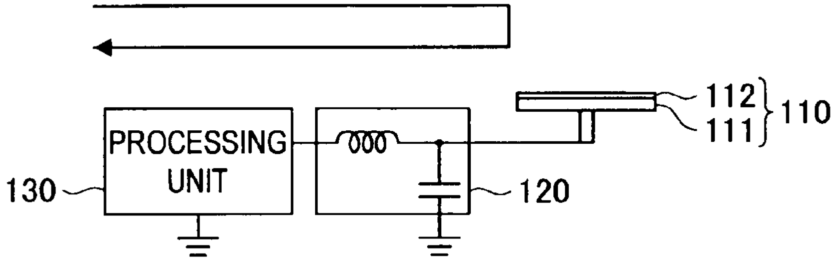
FIG. 2B is an explanatory view which illustrates the operation of the communication apparatus according to the present embodiment.
Figure 2C:
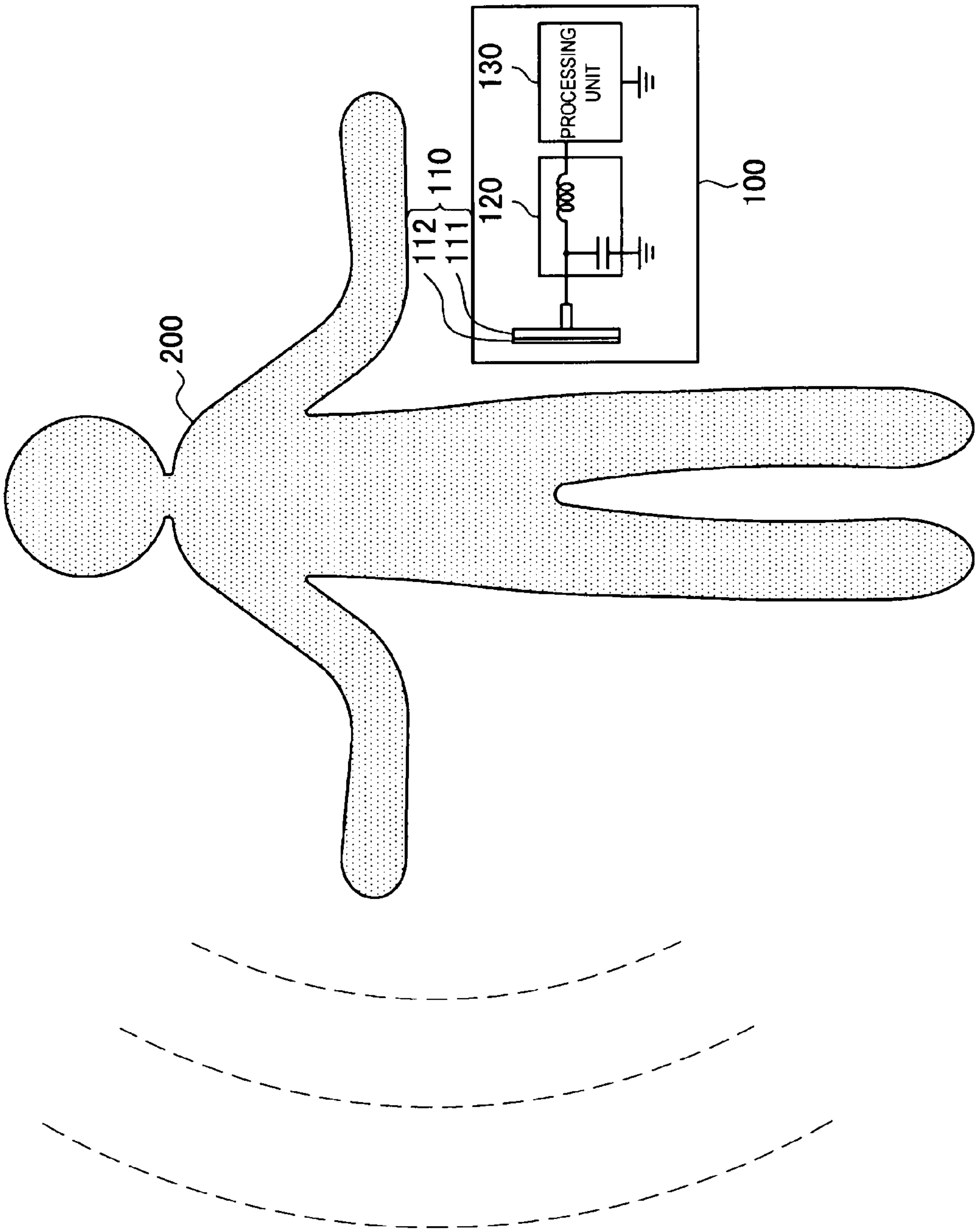
FIG. 2C is an explanatory view which illustrates the first example of the capacitive coupling of the communication apparatus according to the present embodiment.
Figure 2D:
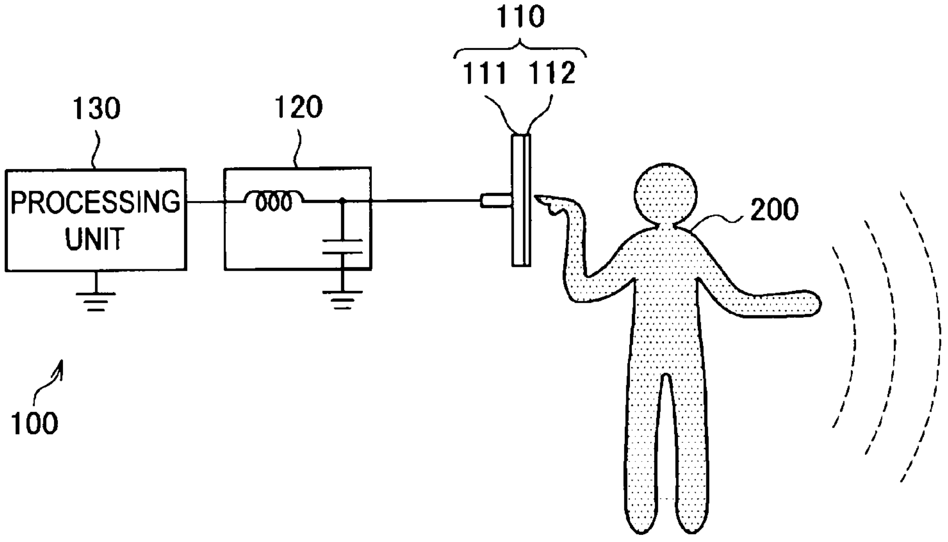
FIG. 2D is an explanatory view which illustrates the second example of the capacitive coupling of the communication apparatus according to the present embodiment.
Figure 2E:
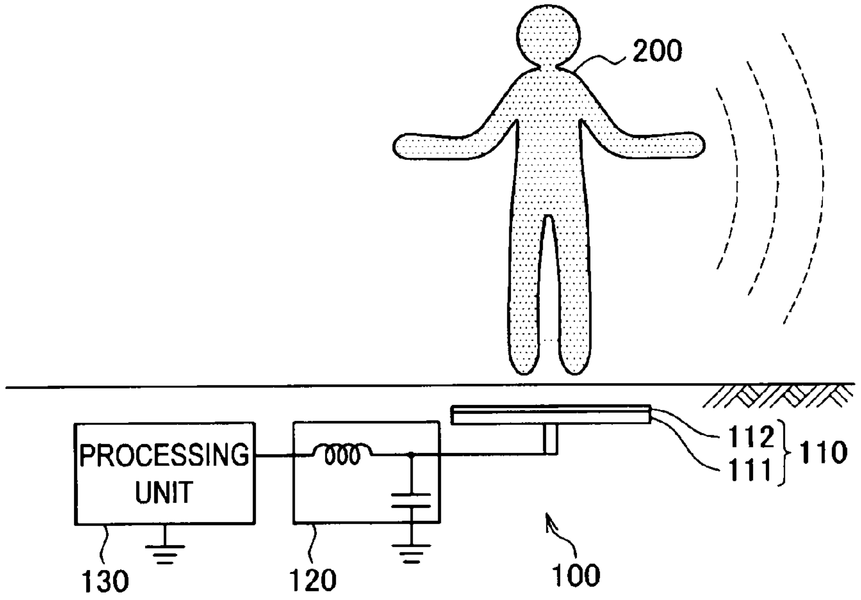
FIG. 2E is an explanatory view which illustrates the third example of the capacitive coupling of the communication apparatus according to the present embodiment.
Figure 3:
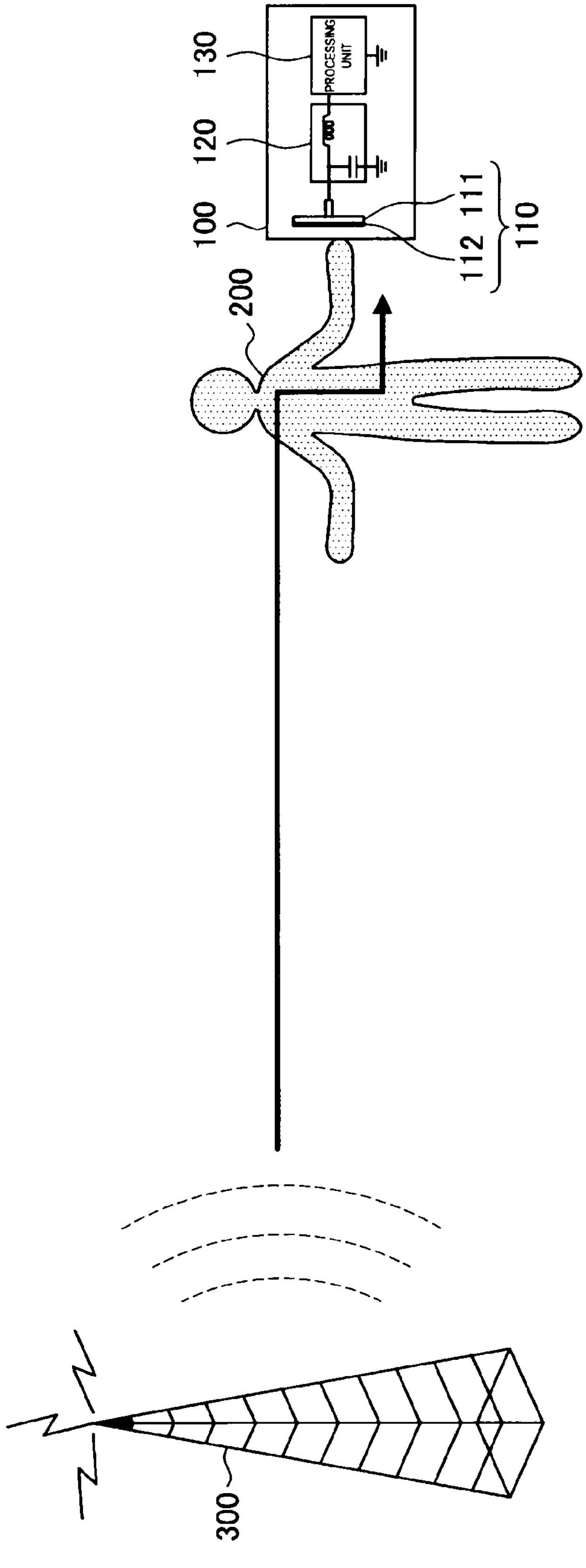
FIG. 3 is an explanatory view which illustrates a communication apparatus according to a second embodiment of the present invention.
Figure 4A:
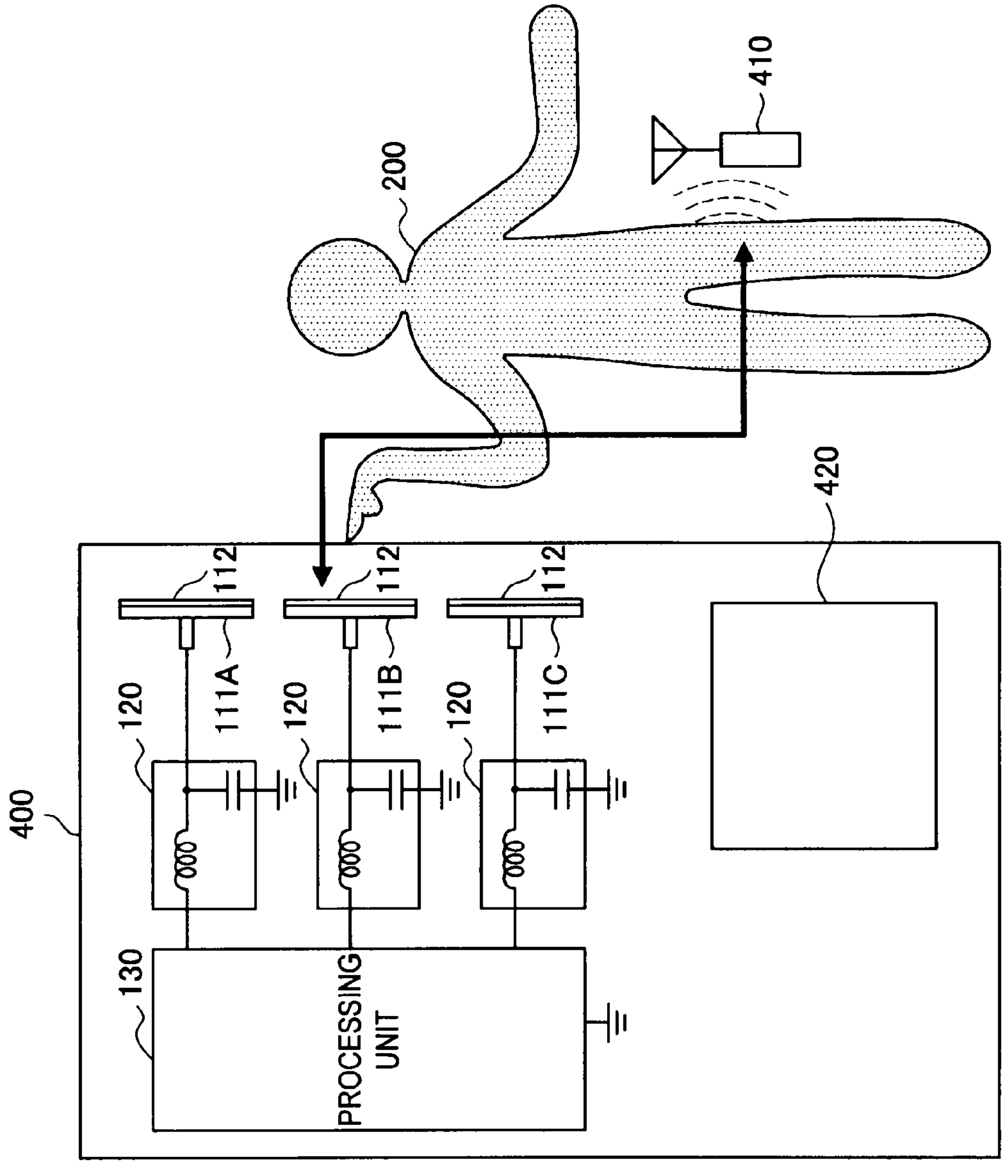
FIG. 4A is an explanatory view which illustrates a communication apparatus according to a third embodiment of the present invention.
Figure 4B:
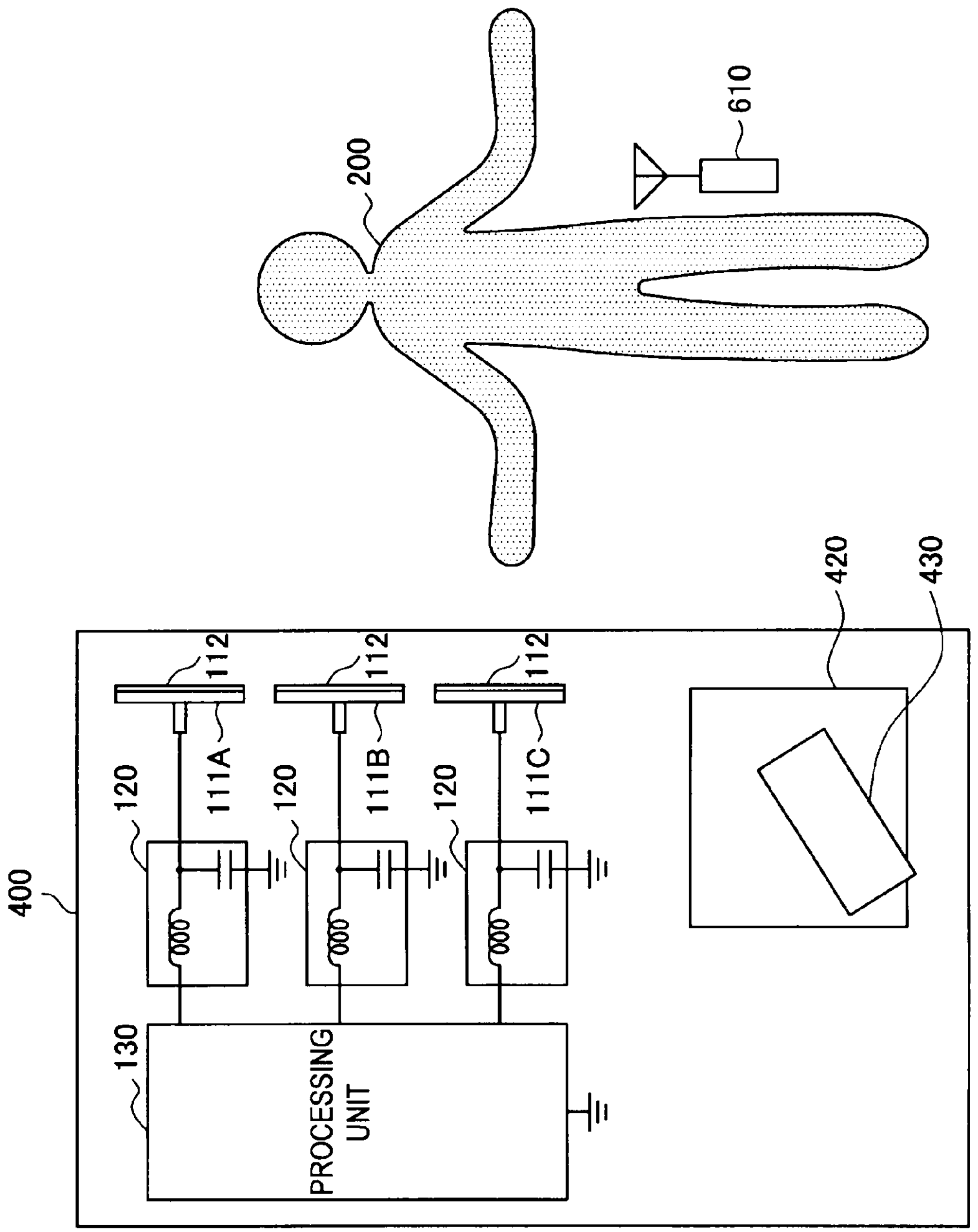
FIG. 4B is an explanatory view which illustrates the communication apparatus according to the third embodiment of the present invention.
Figure 5A:
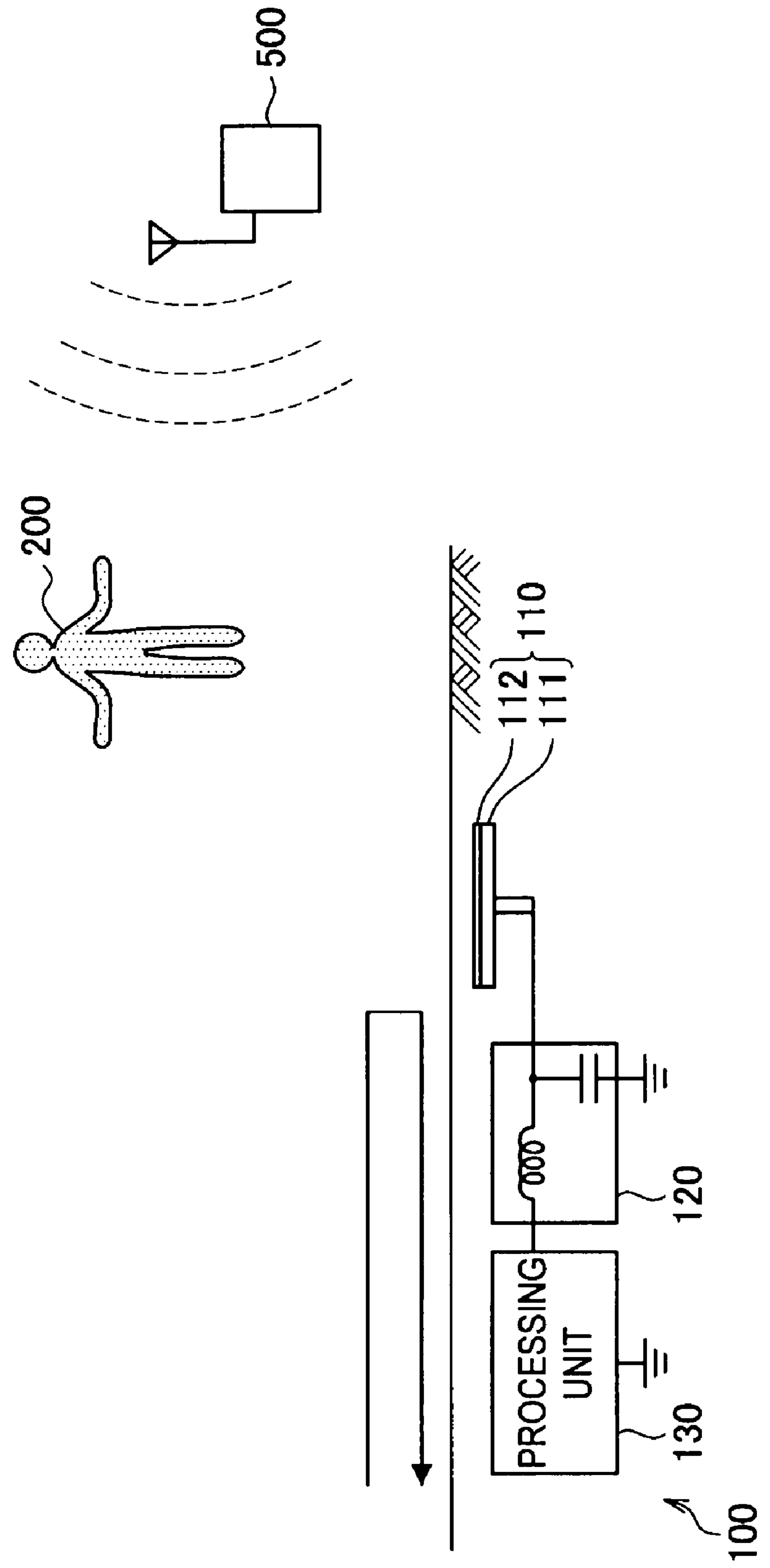
FIG. 5A is an explanatory view which illustrates a communication apparatus according to a fourth embodiment of the present invention.
Figure 5B:
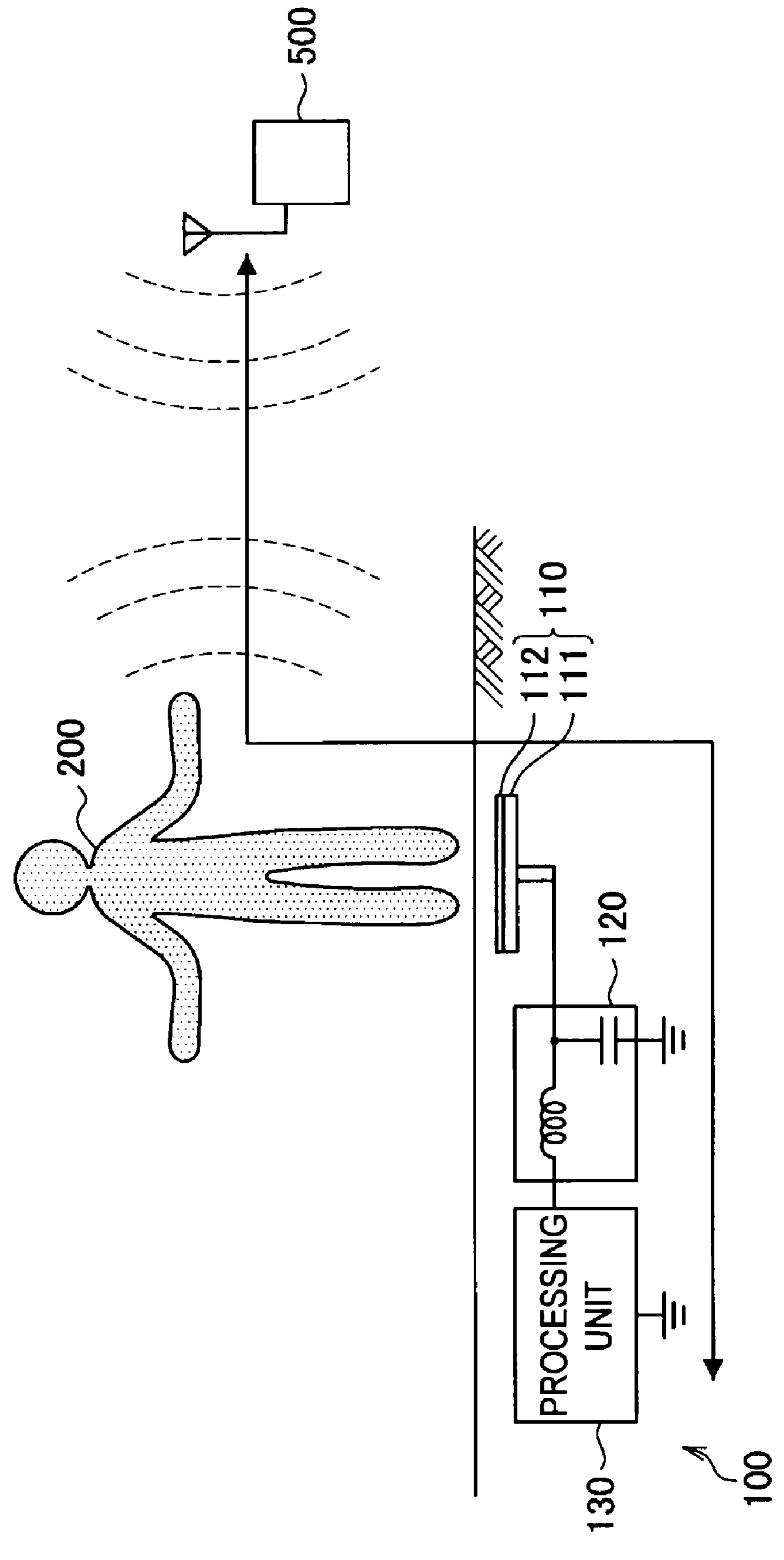
FIG. 5B is an explanatory view which illustrates the communication apparatus according to the fourth embodiment of the present invention.
Figure 6A:
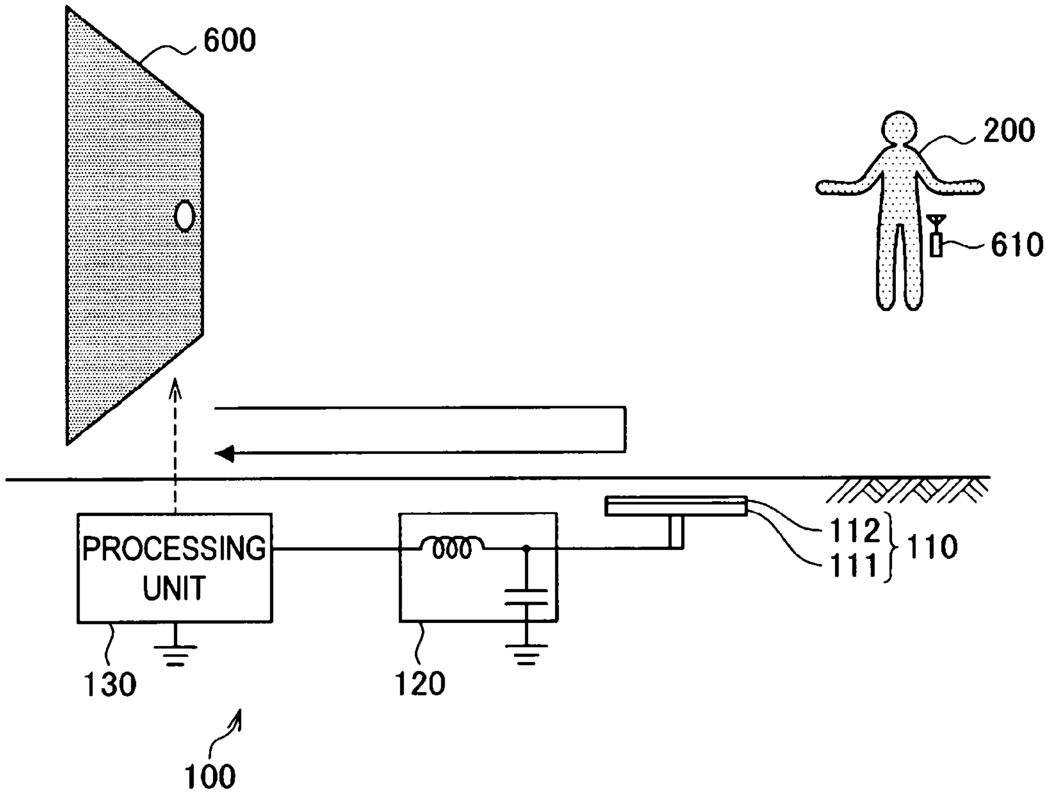
FIG. 6A is an explanatory view which illustrates a communication apparatus according to a fifth embodiment of the present invention.
Figure 6B:
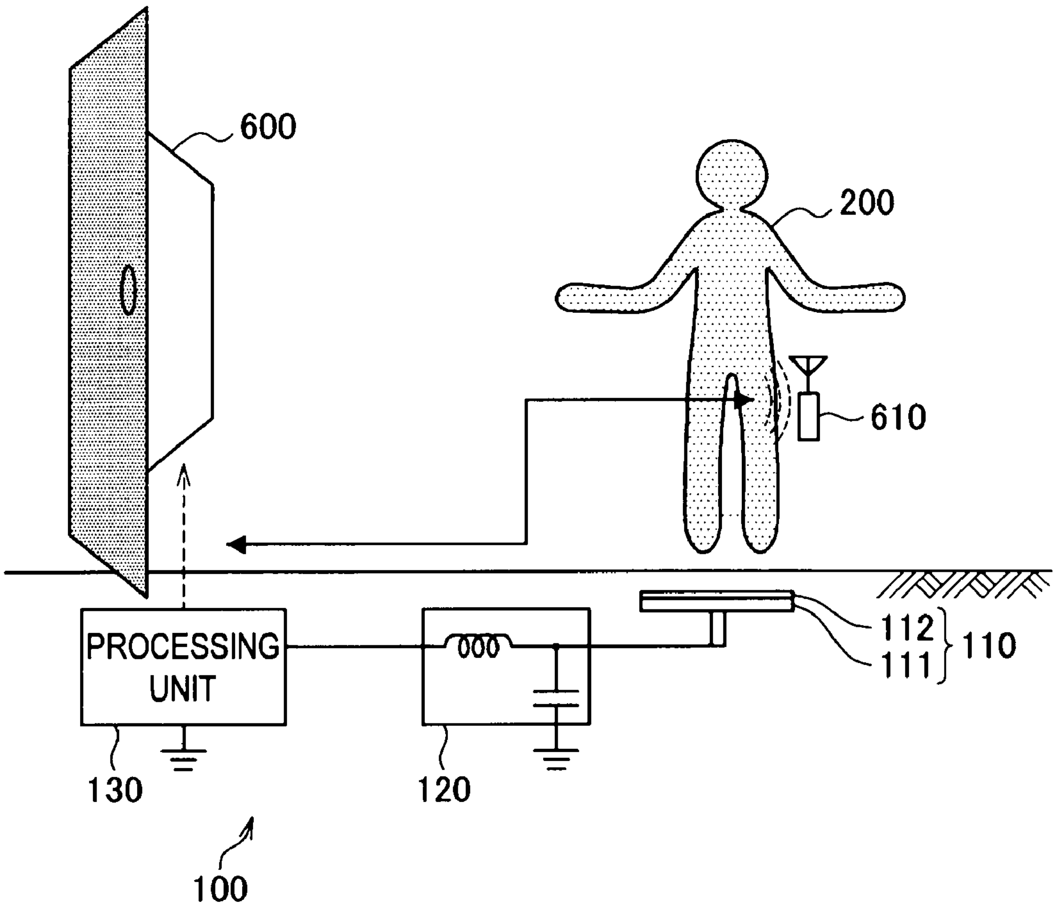
FIG. 6B is an explanatory view which illustrates the communication apparatus according to the fifth embodiment of the present invention.
Figure 7:
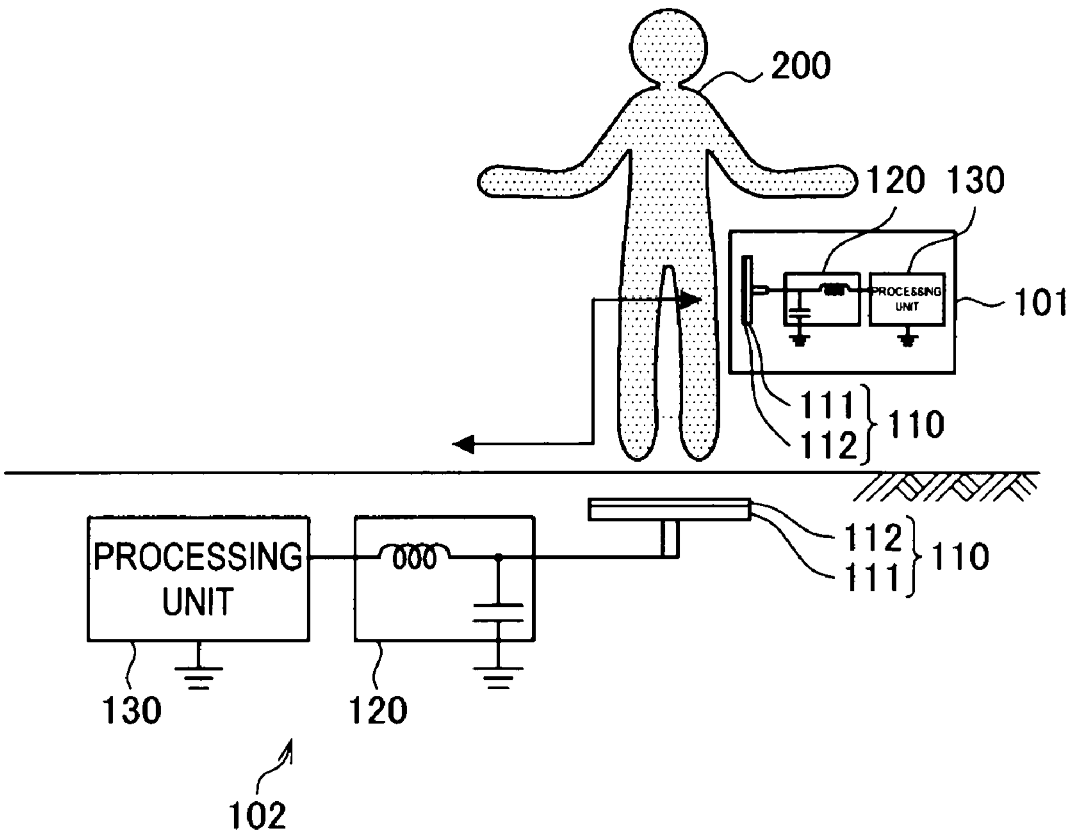
FIG. 7 is an explanatory view which illustrates a communication apparatus according to a sixth embodiment of the present invention.
Figure 8:
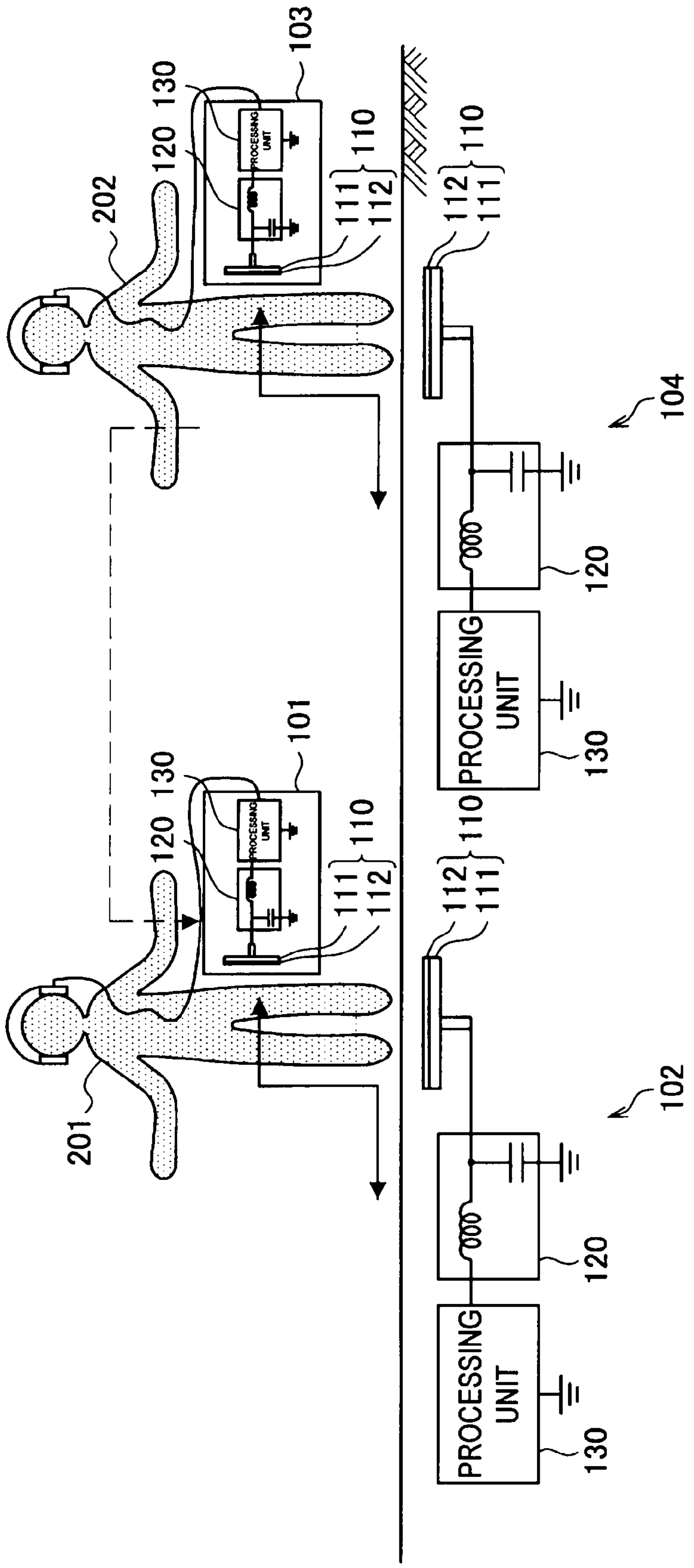
FIG. 8 is an explanatory view which illustrates a communication apparatus according to a seventh embodiment of the present invention.

What is claimed is:

1. A communication apparatus comprising:

a capacitive coupling electrode which is capacitively coupled with an adjacent conductor or an adjacent dielectric and which operates the conductor or the dielectric as an antenna element for electromagnetic waves of a predetermined frequency; and a matching circuit which is connected to the capacitive coupling electrode and which matches impedance of the conductor or the dielectric to be operated as the antenna element for the electromagnetic waves of the predetermined frequency when the conductor or the dielectric is capacitively coupled with the capacitive coupling electrode, wherein the matching circuit is configured so that voltage standing wave ratio becomes nearer to 1 when the conductor or the dielectric is capacitively coupled with the capacitive coupling electrode than that when the conductor or the dielectric is not capacitively coupled with the capacitive coupling electrode.

2. The communication apparatus according to claim 1, further comprising:

an insulating member which performs insulation between the capacitive coupling electrode and the conductor or the dielectric which is adjacent to the capacitive coupling electrode.

3. The communication apparatus according to claim 1, wherein the conductor or the dielectric is a human body.

4. The communication apparatus according to claim 3, wherein the capacitive coupling electrode is formed to a plate-shape which is larger than a shape of the adjacent human body projected to the capacitive coupling electrode.

5. The communication apparatus according to claim 1, wherein the capacitive coupling electrode operates the conductor or the dielectric as the antenna element for the electromagnetic waves having a wavelength of the same level as the length of the conductor or the dielectric.

6. The communication apparatus according to claim 1, further comprising:

a processing unit which performs a predetermined process in accordance with presence or absence of a reception signal received by the conductor or the dielectric operating as the antenna element for the electromagnetic waves of the predetermined frequency.

7. The communication apparatus according to claim 6, wherein the processing unit determines to provide a predetermined service or not in accordance with presence or absence of the reception signal.

8. The communication apparatus according to claim 7, wherein the processing unit makes an external processing apparatus operate the predetermined process when the reception signal is received.

9. The communication apparatus according to claim 1, wherein the capacitive coupling electrode operates the conductor or the dielectric as the antenna element which receives broadcast waves.

10. A communication apparatus comprising:

a plurality of the capacitive coupling electrodes, a capacitive coupling electrode which is capacitively coupled with an adjacent conductor or an adjacent dielectric and which operates the conductor or the dielectric as an antenna element for electromagnetic waves of a predetermined frequency; and a matching circuit which is connected to the capacitive coupling electrode and which matches impedance of the conductor or the dielectric to be operated as the antenna element for the electromagnetic waves of the predetermined frequency when the conductor or the dielectric is capacitively coupled with the capacitive coupling electrode;

a processing unit which performs a predetermined process in accordance with presence or absence of a reception signal received by the conductor or the dielectric operating as the antenna element for the electromagnetic waves of the predetermined frequency;

wherein the processing unit determines which process is to be performed among predetermined processes in accordance with that which electrode among the plurality of capacitive coupling electrodes has received the reception signal.

* * * * *